April 7, 1953     J. L. HAINES     2,633,792
ROOT SEVERING ATTACHMENT FOR TRACTORS
Filed Dec. 12, 1949
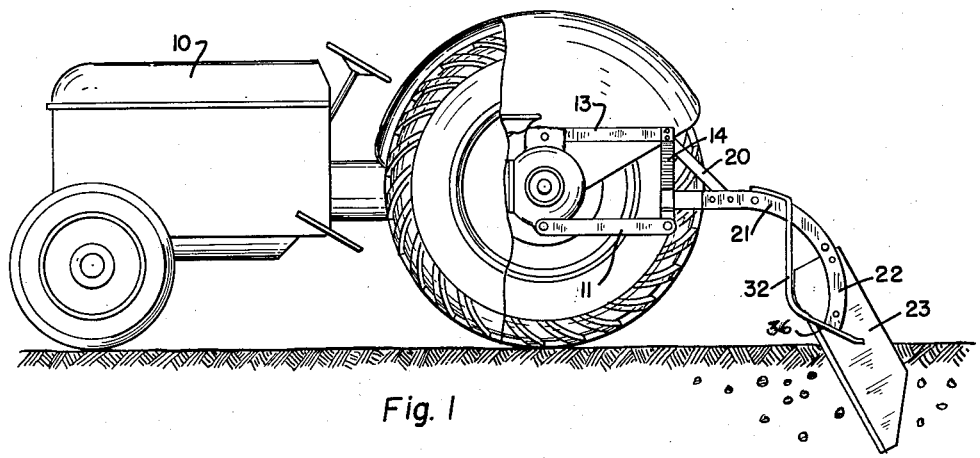
Fig. 1
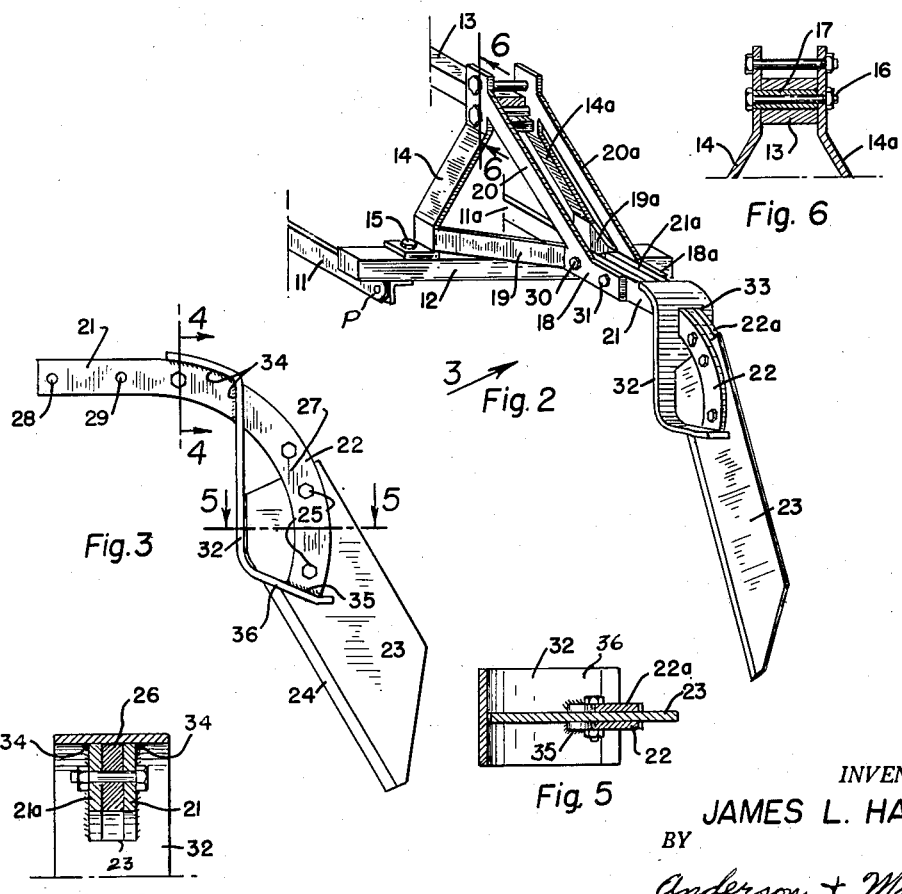
INVENTOR.
JAMES L. HAINES
BY
Anderson + Muller
ATTORNEYS Patented Apr. 7, 1953

2,633,792

UNITED STATES PATENT OFFICE 2,633,792

ROOT SEVERING ATTACHMENT FOR TRACTORS

James L. Haines, Denver, Colo.

Application December 12, 1949, Serial No. 132,495

1 Claim. (Cl. 97—226.1)

This invention relates to improvements in devices for pruning tree roots.

Certain sodded areas such as golf courses, large estates, and the like, have trees thereon, the roots of which rob the grass of moisture and hence detract from an optimum growth of grass in the vicinity of the trees. It has been found that the growth of these trees may be controlled by judicious pruning of the roots thereof, which pruning does not kill the trees, yet permits a greater proportion of the soil moisture to be absorbed by the glass to thus enhance optimum growth of the latter.

In the pruning operation it is desirable to disrupt the soil as little as possible so that no fills or replacement of soil or sod is necessary. The present invention more particularly relates to devices for attaining this object.

Another object is to provide a root severing blade which may be attached to conventional tractors.

Another object is to control lifting, lowering, and otherwise positioning the severing blade by the power hitch means provided on a tractor.

Another object is to provide a rearwardly slanting severing blade which, in operation, severs the roots without tending to lift them toward the surface of the ground.

Another object is to provide the blade with means for limiting downward movement thereof into the ground.

Further objects are to provide a severing attachment which is simple and rugged in construction, economical to manufacture, and is efficient in operation.

Still further objects, advantages, and salient features will become more apparent from a consideration of the description to follow, the appended claim, and the accompanying drawing, in which:

Figure 1 is a side elevation of a conventional tractor, a portion being broken away, showing the manner of attaching the root severing device thereto;

Figure 2 is an isometric view of the device and portions of the power operated hitch of the tractor;

Figure 3 is a side elevation of the root severing unit taken in the direction of arrow 3 Figure 2;

Figure 4 is a section taken on line 4—4, Figure 3;

Figure 5 is a section taken on line 5—5, Figure 3; and

Figure 6 is a section taken on line 6—6, Figure 2.

Referring in detail to the drawing, tractor 10 is provided with a power hitch comprising traction links 11, 11a, pivoted at their front ends to the tractor and pivoted at their rear ends, as at P, to a transverse draft bar 12. A lifting link or arm 13 is also provided, the rear end of this link being raised or lowered by power from the tractor, applied to the forward end of the link so that an implement connected to draft bar 12 and lifting link 13 may also be raised, lowered or fixed at a desired position relative to the ground, all as more fully disclosed by the patent to Ferguson, No. 2,118,180, dated May 24, 1938. It is to be understood that this patent is exemplary, only, and that the present invention may be used with other power operated hitches and with other types of hitches whether power or otherwise operated.

A pair of upstanding bars 14, 14a are secured at their lower ends to draft bar 12 by bolts 15 and the upper ends are secured together by bolt 16 which extends through a tubular spacer member 17 which may be secured to one of members 14 or 14a. The rear end of link 13 is journaled on this spacer. The upstanding bars 14, 14a have secured thereto rearwardly extending portions 18, 18a respectively, by means of angularly disposed bars 19, 19a and downwardly ranging brace bars 20, 20a. It will be observed that portions 18, 18a are braced laterally by bars 19, 19a and vertically by bars 20, 20a, and that members 14, 14a provide an A frame for connection at the top thereof to lifting link 13. This assembly provides an exceedingly strong construction which is well braced in all directions to withstand the forces applied thereto.

The severing device comprises a pair of rearwardly extending bars 21, 21a having downwardly curved portions 22, 22a, respectively. A root severing blade 23 having a cutting edge 24 thereon is disposed between the downwardly curved portions and is secured thereto by bolts 25 which extend through said portions and the blade.

A spacer bar 26, the same thickness as the blade and curved the same shape as bars 22, 22a is disposed between the latter from a point adjacent the top edge of the blade, at 27, to the forward ends of bars 22, 22a. Suitable holes 28, 29 extend through the bars 21, 21a, and spacer bar 26 and the severing unit is secured to portions 18, 18a by means of bolts 30, 31 which extend through these portions and the bars.

A brace plate 32 is provided having a rectangular aperture 33 through which bars 22, 22a and 26 extend, this plate being welded as shown at 34 to the bars 22, 22a. The lower rear end of the plate is provided with a slot for receiving the severing blade therein and the ends of the plate, on each side of the blade, are welded to the lower ends of bars 21, 21a, as shown at 35. The downwardly ranging portion 36 of the plate acts as a stop, which engages the surface of the ground or sod, to limit unauthorized movement of the blade into the ground.

It is to be particularly noted that the edge 24 of the severing blade 23 slants downwardly and rearwardly, which tends to force the roots downwardly as it cuts them, thereby preventing any disruption of the ground above the roots. As the blade moves through the ground it leaves a slot therein of a width only the thickness of the blade, which may be easily closed by running over it with a tractor wheel. If desired, a closing roller may be attached to the rear of the severing device which will attain the same result. In some cases it may be desirable to add weight to the device, which may conveniently be added to the top end of plate 32.

Having described the invention, what I claim as new is:

A root severing device for attachment to the rear end of a tractor, comprising a frame formed from two downwardly curved members terminating at their upper ends in straight forwardly extending tangential portions, a spacer positioned between the straight tangential portions, the ends and the spacer being connected to form a unitary assembly, an elongated root cutting blade positioned with its upper end between the curved ends of the frame, means for clamping the blade in position between said ends, the cutting edge which faces towards the tractor being downwardly and rearwardly inclined, and a combined depth gauge, guard and brace plate of substantially Z-shape provided adjacent its upper end with an opening through which the curved members extend, the upper end of the brace plate extending forwardly, the lower end of the brace plate being slotted for reception of the root cutting blade, the upper end of the brace plate being welded to the frame above the curved portions thereof and having its lower end welded to the ends of the curved portions adjacent opposite faces of the blade, the lower and rearwardly extending end of the brace plate forming a depth gauge.

JAMES L. HAINES.

REFERENCES CITED

The following references are of record in the file of this patent:

UNITED STATES PATENTS

| Number | Name | Date |
| --- | --- | --- |
| 605,497 | Melton | June 14, 1898 |
| 1,534,098 | Wood | Apr. 21, 1925 |
| 1,937,428 | Keefe | Nov. 28, 1933 |

OTHER REFERENCES

"Farm Implement and Machinery Review," vol. 74, No. 886, February 1, 1949, page 1074.